(12) United States Patent
Ghorishi et al.

(10) Patent No.: US 8,048,818 B2
(45) Date of Patent: Nov. 1, 2011

(54) IN-SITU REGENERATION OF A CATALYST MASKED BY CALCIUM SULFATE

(75) Inventors: S. Behrooz Ghorishi, Uniontown, OH (US); Stanley J. Vecci, Washington Township, Stark County, OH (US); Lawrence E. McDonald, Copley, OH (US); Donald P. Tonn, Copley, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 889 days.

(21) Appl. No.: 12/055,439

(22) Filed: Mar. 26, 2008

(65) Prior Publication Data
US 2009/0247392 A1    Oct. 1, 2009

(51) Int. Cl.
*B01J 38/66* (2006.01)

(52) U.S. Cl. ............................................. 502/26; 502/54

(58) Field of Classification Search .................... 502/26, 502/31, 33, 34, 54
See application file for complete search history.

(56) References Cited

U.S. PATENT DOCUMENTS

| 2,970,893 | A | * | 2/1961 | Prentiss | 423/170 |
| 4,507,397 | A | * | 3/1985 | Buss | 502/38 |

* cited by examiner

*Primary Examiner* — Edward Johnson
(74) *Attorney, Agent, or Firm* — Michael J. Seymour; Eric Marich; Kathryn W. Grant

(57) ABSTRACT

An in-situ method for regenerating a deactivated catalyst removes a calcium sulfate layer masking active catalyst sites. A reducing agent converts the calcium sulfate to calcium oxide, which is then removed, by reintrainment into the flue gas steam using soot blowers or sonic horns. The method is particularly useful for regenerating selective catalytic reduction (SCR) catalysts used to remove nitrogen oxides from flue gas produced by combustion of coal from the Powder River Basin. The method can be practiced using existing SCR system hardware, and without removing the SCR system from service.

26 Claims, 3 Drawing Sheets

IN-SITU REGENERATION OF A CATALYST MASKED BY CALCIUM SULFATE

FIELD AND BACKGROUND OF THE INVENTION

The present invention relates generally to methods of cleaning exhaust gas, and in particular to a new and useful method for regenerating a catalyst used to remove nitrogen oxides from exhaust gas produced by the burning of coal.

Selective catalytic reduction (SCR) technology is used worldwide to control $NO_x$ emissions from combustion sources at higher temperatures (550-750 degrees F.). High temperature SCR technology has been used in Japan for $NO_x$ control from utility boilers since the late 1970's, in Germany since the late 1980's, and in the US since the late 1990's. The function of the SCR system is to react $NO_x$ with ammonia ($NH_3$) and oxygen in the presence of a catalyst to form molecular nitrogen and water.

As shown in FIG. 1, SCR systems are located in a stream of flowing flue gas 15. Ammonia is injected into the hot flue gas upstream of the selective catalytic reduction reactor 20 by an ammonia injection system 10, such as an ammonia injection grid. Known systems for injecting ammonia upstream of an SCR catalyst are described in U.S. Pat. Nos. 5,380,499, 5,437,851 and 6,887,435, all assigned to The Babcock & Wilcox Company at issue, and which are hereby incorporated by reference as though fully set forth herein. The flue gas, with the ammonia, passes across the surface of the SCR catalyst 30, which is arranged in several layers within reactor 20. Industrial scale selective catalytic reduction reactors have been designed to operate principally in the temperature range of 500 degrees F. to 900 degrees F., but most often in the range of 550 degrees F. to 750 degrees F. Ash entrained in the flue gas may deposit on catalyst 30, and reactor 20 may include catalyst cleaning devices 50, such as sootblowers and/or sonic horns.

Additional details of the characteristics of SCR systems are available in Chapter 34 of *Steam/Its Generation and Use*, 41st Edition, The Babcock & Wilcox Company, Barberton, Ohio, U.S.A., © 2005, the text of which is hereby incorporated by reference as though fully set forth herein.

Catalysts 30 are typically modestly noble metals such as vanadium, titanium, molybdenum and tungsten and a variety of their oxides. These catalysts are generally preferred because they exhibit good resistance to sulfur poisoning.

Chemical poisoning of SCR catalysts occurs in all types of coal combustion flue gases. SCR catalysts are chemically deactivated by catalyst poisons, which are contained in the coal combustion flue gases or fly ash in the form of heavy metals such as mercury, arsenic, thallium, etc. This "chemical poisoning" results from the reaction of SCR active components such as W, V, and Mo, with, for example, oxides of the heavy metals compounds and/or phosphate Reversing chemical poisoning and regenerating SCR catalyst typically requires complicated, multi-step procedures. For example, U.S. Pat. No. 6,596,661 describes a 4-step procedure to regenerate a chemically poisoned catalyst. This procedure involves taking the SCR off-line (by means of a by-pass) and contacting the catalyst with 1) a reducing agent and 2) washing the catalyst with a polyfunctional complex forming agent such as hydrocarboxylic acid. Steps 1 and 2 eliminate the chemical bonds between poisons and the SCR active components, and redistribute the remaining active components. In step 3, the catalyst is contacted with a solution or a suspension of active components (such as V, W, . . . ) in the polyfunctional agent solution in order to restore the original activity of the SCR catalyst. In the final step (step 4) the catalyst is dried by air at about 160 degrees F. This regeneration process is complicated, time-consuming and requires the SCR to be taken off-line.

Fuel cost issues, as well as strict $SO_2$ and $SO_3$ emissions limits, have resulted in a significant increase in the number of US utilities burning low sulfur coal from the Powder River Basin (PRB) of Wyoming and Montana. Many utilities burning PRB coal are now confronted with the necessity of installing SCR units to meet strict $NO_x$ emission limits. There are a number of uncertainties regarding SCR activity performance in PRB coal combustion systems. Unexpected and accelerated deactivation of SCR catalysts exposed to PRB coal combustion flue gas has been observed.

Rigby et al., of Siemens KPW, in their paper "SCR Catalyst Design Issues and Operating Experience: Coals with High Arsenic Concentrations and Coal from the Powder River Basin" (in the Proceedings of 2000 International Joint Power Generation Conference, Miami Beach, Fla., Jul. 23-26, 2000, IPJGC2000-15067) have provided a comprehensive review of the influential parameters in PRB coal combustion that can lead to an accelerated deactivation of SCR catalyst, the text of which is hereby incorporated by reference as though fully set forth herein. The authors concluded that the main deactivation mechanism for SCR catalysts exposed to PRB coal combustion flue gases is most likely the formation of a dense, calcium sulfate ($CaSO_4$) layer on the surface of the catalyst. This layer blocks the entrance of the flue gas to the pores of the catalyst, thus masking the active sites of the catalyst. The authors also concluded that the presence of large amounts of free calcium oxide (CaO) is the essential factor in the $CaSO_4$ formation mechanism. FIG. 2 is a schematic diagram from the paper illustrating the calcium sulfate masking of an SCR catalyst.

The Rigby et al. authors proposed the following mechanism for the formation of a calcium sulfate surface coating on SCR catalysts in PRB applications:
(1) Free CaO (in fly ash) is deposited onto catalyst surface
(2) $SO_2$ (in exhaust gas)→$SO_3$ (on catalyst surface)
(3) Free CaO (on catalyst surface)+$SO_3$ (g)→$CaSO_4$ (calcium sulfate coating)

It is apparent that an economical and easy to implement method of reactivating a catalyst deactivated due to masking by a calcium sulfate layer would be welcomed by industry.

SUMMARY OF THE INVENTION

The present invention is drawn to a novel, in-situ method to periodically regenerate a selective catalytic reduction catalyst deactivated as the result of masking by a layer of calcium sulfate ($CaSO_4$). This is in contrast with methods to regenerate selective catalytic reduction catalysts that are de-activated as the result of chemical poisoning.

Briefly, in the present method, the calcium sulfate layer on a catalyst within a selective catalytic reduction reactor is converted to calcium oxide (CaO) by contact with a reducing agent. The calcium oxide is then easily removed from the catalyst, by reentrainment into the flue gas with assistance from the catalyst cleaning devices that may already be installed in an SCR reactor.

The present invention can be used as frequently as necessary, and is easy to implement. Advantageously, since the invention can be practiced using existing SCR hardware, little or no additional SCR hardware needs to be installed.

Moreover, the present invention is advantageously very inexpensive to implement. The cost is estimated to be minimal, and consists of the cost of the reducing agent, which is used intermittently, and only in parts per million levels. A variety of reducing agents may be used to eliminate the $CaSO_4$ blocking layer with this method.

Only a small concentration of reducing agent and a very short contact time is advantageously required to regenerate the SCR catalyst back to its original fresh state. The implementation of the present invention will not interfere with the normal operation of industrial scale selective catalytic reduction reactors.

Accordingly, one aspect/object of the invention is drawn to a method of removing a calcium sulfate layer formed on a catalyst by contacting the calcium sulfate layer with a reducing agent to convert the calcium sulfate ($CaSO_4$) to calcium oxide (CaO), and then removing the calcium oxide.

Another aspect of the invention is drawn to a method for regenerating the selective catalytic reduction catalyst of a selective catalytic reduction system for removing nitrogen oxides ($NO_x$) from the exhaust gas of a coal-fired boiler. The method includes contacting a calcium sulfate ($CaSO_4$) layer formed on the catalyst with a reducing agent for a time and in an amount sufficient to convert the calcium sulfate ($CaSO_4$) to calcium oxide (CaO), and then removing the calcium oxide.

Yet another aspect of the invention is drawn to an in-situ method for regenerating the selective catalytic reduction catalyst within the selective catalytic reduction reactor of a system for removing nitrogen oxides ($NO_x$) from the exhaust gas of a coal-fired boiler. The system for removing $NO_x$ includes an ammonia injection system located upstream of the selective catalytic reduction catalyst. The catalyst within the reactor is contacted with a gaseous reducing agent supplied through the ammonia injection system for a time and in an amount sufficient to convert a calcium sulfate ($CaSO_4$) layer formed on the catalyst to calcium oxide (CaO). The calcium oxide is subsequently reentrained into the flue gas flow with assistance from removal means such as sootblowers and/or sonic horns.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

The subject invention is a method for regenerating a deactivated selective catalytic reduction (SCR) catalyst through chemical removal of $CaSO_4$ deposits. The hard-shell $CaSO_4$ deposit is contacted with a reducing agent, and is thereby converted to a porous and non-sticky CaO powder. The CaO powder is then removed from the surface of the SCR catalyst and subsequently reentrained into the flue gas stream utilizing removal means such as but not limited to soot blowers and sonic horns.

A number of reducing agents such as methane ($CH_4$), hydrogen ($H_2$), carbon monoxide (CO), and hydrocarbons can be used in the method of the subject invention. Straight chain aliphatic hydrocarbons present a cost-effective class of suitable reactants. Methane ($CH_4$), for example, is a good reducing agent. Conversion of $CaSO_4$ to CaO by $CH_4$ can proceed according to the following reactions:

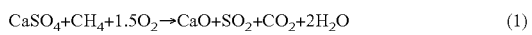

$$CaSO_4 + CH_4 + 1.5O_2 \rightarrow CaO + SO_2 + CO_2 + 2H_2O \quad (1)$$

$$CaSO_4 + CH_4 + 2O_2 \rightarrow CaO + SO_3 + CO_2 + 2H_2O \quad (2)$$

Figure 1:
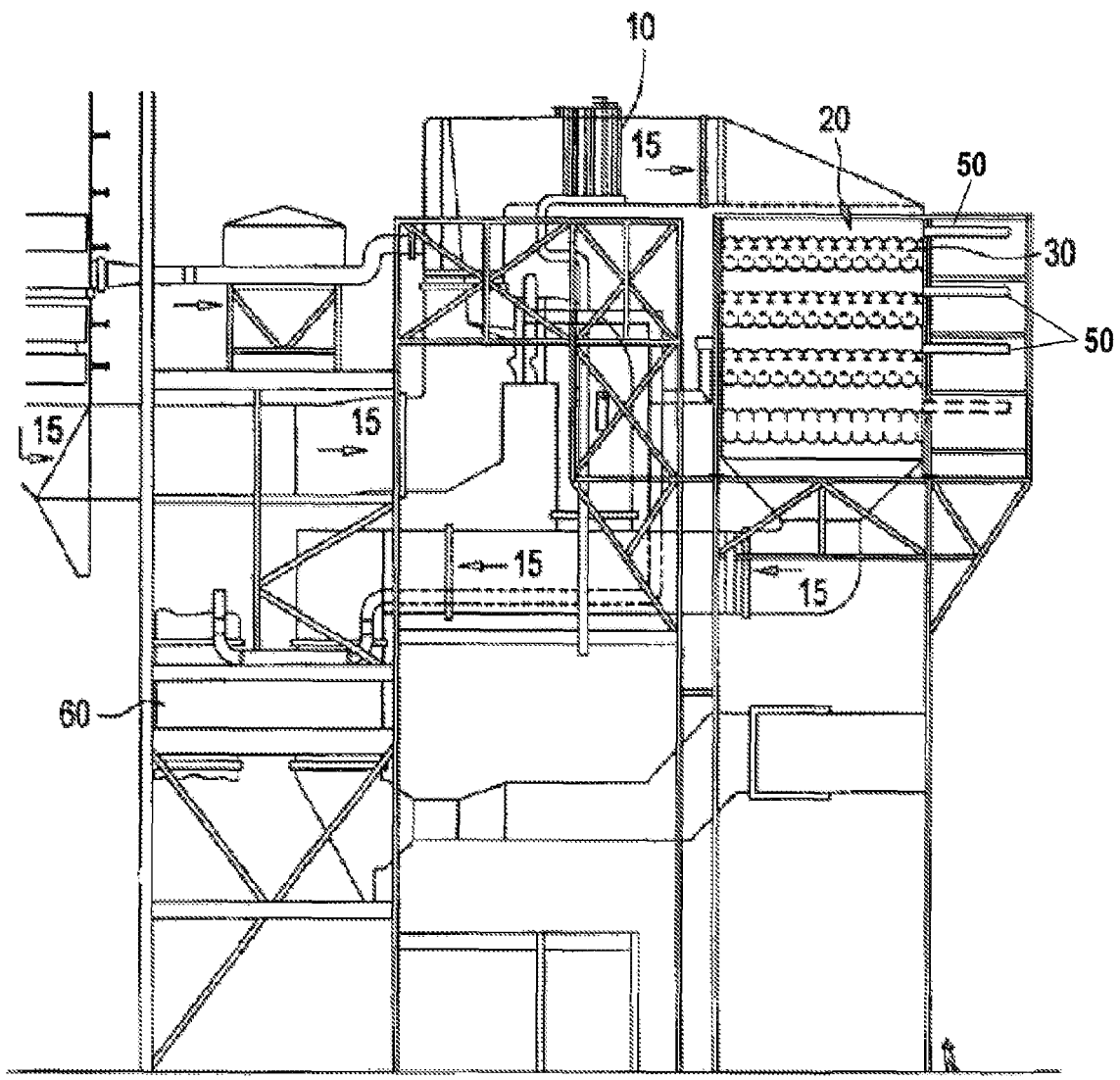
FIG. 1 is a side sectional schematic view of a known SCR system.
Figure 2:
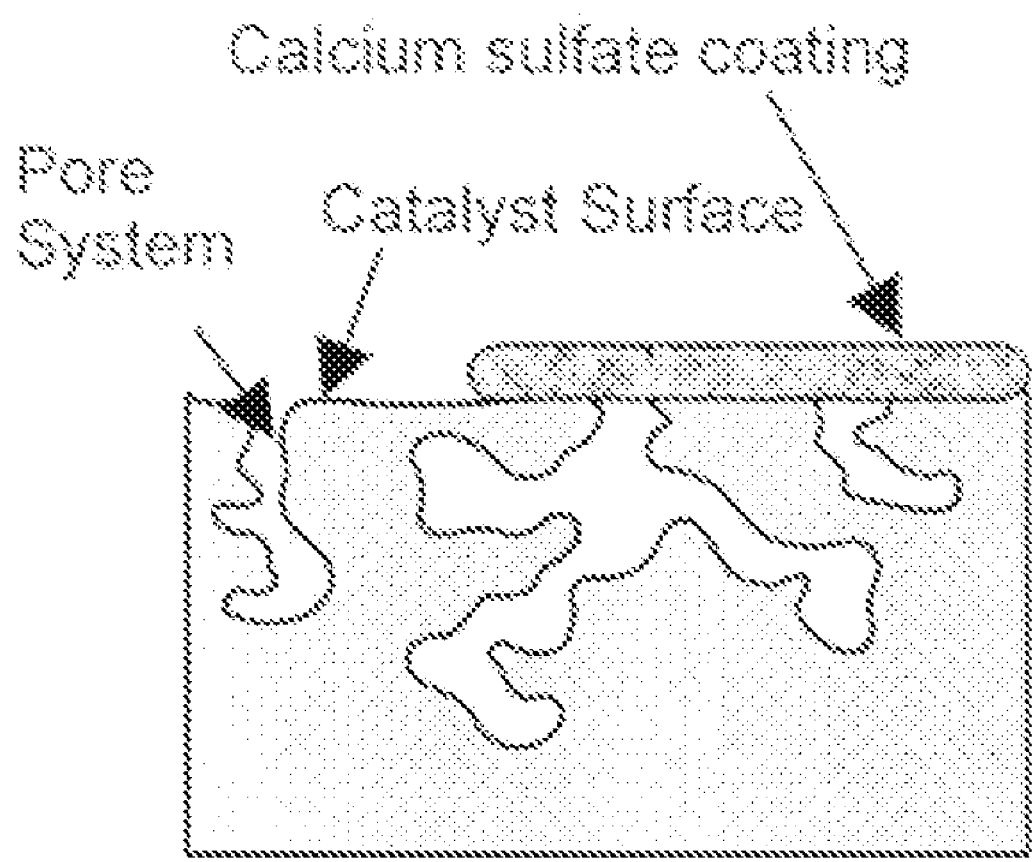
FIG. 2 is a diagram illustrating a proposed mechanism for deactivation of an SCR catalyst exposed to exhaust gas from the combustion of coal from the Powder River Basin.
Figure 3:
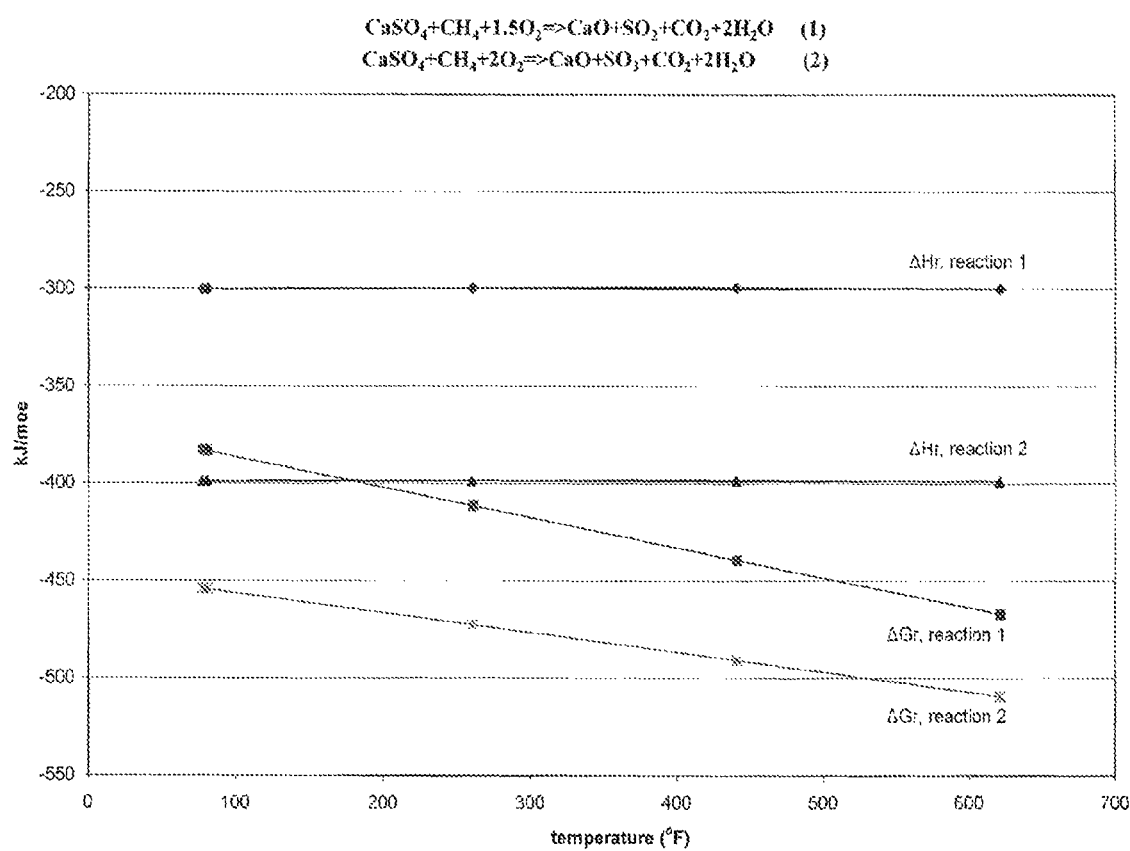
FIG. 3 is a graph of chemical thermodynamic data for a particular reducing agent suitable for use in the present invention.

As shown in FIG. 3, both reactions 1 and 2 are thermodynamically favored at SCR reaction temperatures (greater than 550 degrees F.). Both reactions are exothermic (negative heat of reaction, $\Delta Hr$). Furthermore, the reaction Gibbs free energy change ($\Delta Gr$) is also negative, and $\Delta Gr$ is more favorable at high reaction temperatures. These thermodynamic data indicate the above reduction reactions will go to completion at SCR reaction temperatures resulting in the complete removal of the hard $CaSO_4$ deposits.

A gaseous-phase reducing agent can be uniformly distributed in the flue gas upstream of the SCR catalyst using the existing ammonia injection system, such as an Ammonia Injection Grid (AIG) or other means of injection and distribution. A few parts per million to several thousand parts per million of reducing agent can preferably be used depending on the extent of deactivation of the SCR catalyst, the exact concentration being chosen at a concentration below the lower explosion limit (LEL) for the chosen reducing agent. The reducing agent contact time can also vary from a few minutes to a few hours. A normal soot blowing process can then be employed to clean the CaO from the catalyst surfaces.

The method of the present invention is easy to implement, and can be carried out as frequently as necessary. The regeneration can advantageously be carried out with the SCR still in service, or by sending hot air through SCR.

As an alternative to gaseous-phase reducing agents, liquid-phase reducing agents may used in the method of the subject invention, but may require installation of additional hardware for their uniform distribution.

In an alternative embodiment removal means may include or be entirely comprised of washing the surface of the catalyst with dilute solutions of a weak acid, wherein the weak acid removes CaO particles.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example, this regeneration process is also applicable to bituminous coal combustion processes.

The invention claimed is:

1. A method for the regeneration of a selective catalytic reduction catalyst by removing at least one calcium sulfate layer located on the selective catalytic reduction catalyst, the method comprising the steps of:
   (i) providing a selective catalytic reduction catalyst having deposited thereon at least one calcium sulfate layer;
   (ii) supplying at least one reducing agent to the selective catalytic reduction catalyst, wherein the at least one reducing agent is selected based on its ability to convert the at least one calcium sulfate layer located on the selective catalytic reduction catalyst to at least one calcium oxide layer located on the selective catalytic reduction catalyst;

(iii) contacting the at least one reducing agent with the at least one calcium sulfate layer located on the selective catalytic reduction catalyst in order to convert the at least one calcium sulfate layer to at least one calcium oxide layer; and (iv) removing the at least one calcium oxide layer from the selective catalytic reduction catalyst, wherein the selective catalytic reduction catalyst is located in a selective catalytic reduction system during the method, or is located in a selective catalytic reduction system that is in operation during the method, or is utilized in a selective catalytic reduction system after performance of the method.

2. The method of claim 1, wherein the at least one calcium sulfate layer is contacted with the at least one reducing agent at a temperature greater than about 550° F.

3. The method of claim 1, wherein the at least one calcium oxide layer is removed by a calcium oxide removal means.

4. The method of claim 1, wherein the at least one calcium oxide layer on the selective catalytic reduction catalyst is removed by washing with a dilute solution of a weak acid.

5. The method of claim 1, wherein the at least one reducing agent is a gas.

6. The method of claim 1, wherein the at least one reducing agent is a straight chain aliphatic hydrocarbon.

7. The method of claim 1, wherein the at least one reducing agent is selected from methane, hydrogen and carbon monoxide.

8. The method of claim 1, wherein the at least one calcium sulfate layer is contacted with the at least one reducing agent using hot air as a carrier for the at least one reducing agent.

9. The method of claim 1, wherein the at least one reducing agent is a liquid.

10. The method of claim 1, wherein the selective catalytic reduction catalyst is a noble metal catalyst.

11. The method of claim 1, wherein the selective catalytic reduction catalyst is selected from vanadium, titanium, molybdenum, tungsten and oxides thereof.

12. A method for regenerating a selective catalytic reduction catalyst by removing at least one calcium sulfate layer located on the selective catalytic reduction catalyst, where the selective catalytic reduction catalyst is part of a selective catalytic reduction system designed to remove nitrogen oxides from an exhaust gas of a coal-fired boiler, the method comprising the steps of:

(a) providing a selective catalytic reduction catalyst having deposited thereon at least one calcium sulfate layer;

(b) supplying at least one reducing agent to the selective catalytic reduction catalyst, wherein the at least one reducing agent is selected based on its ability to convert the at least one calcium sulfate layer located on the selective catalytic reduction catalyst to at least one calcium oxide layer located on the selective catalytic reduction catalyst;

(c) contacting the at least one reducing agent with the at least one calcium sulfate layer located on the selective catalytic reduction catalyst in order to convert the at least one calcium sulfate layer to at least one calcium oxide layer; and (d) removing the at least one calcium oxide layer from the selective catalytic reduction catalyst, wherein the selective catalytic reduction catalyst is located in a selective catalytic reduction system for a coal-fired boiler during the method, or is utilized in a selective catalytic reduction system for a coal-fired boiler after performance of the method.

13. The method of claim 12, wherein the at least one calcium sulfate layer is contacted with the at least one reducing agent at a temperature greater than about 550° F.

14. The method of claim 12, wherein the selective catalytic reduction system has at least one ammonia injection system located upstream of the selective catalytic reduction catalyst, and the at least one reducing agent is introduced through the at least one ammonia injection system.

15. The method of claim 12, wherein the at least one calcium oxide layer is removed by one of soot blowers and sonic horns.

16. The method of claim 12, wherein the at least one calcium oxide layer is removed by washing with a dilute solution of a weak acid.

17. The method of claim 12, wherein the at least one reducing agent is a straight chain aliphatic hydrocarbon.

18. The method of claim 12, wherein the at least one reducing agent is selected from methane, hydrogen and carbon monoxide.

19. The method of claim 12, wherein the selective catalytic reduction catalyst is contacted with at least one reducing agent using hot air as a carrier for the at least one reducing agent.

20. The method of claim 12, wherein the exhaust gas is produced by the combustion of a low sulfur coal.

21. The method of claim 12, wherein the selective catalytic reduction system is in simultaneous operation to remove nitrogen oxides during the operation of the method of claim 13.

22. A method for regenerating in-situ a selective catalytic reduction catalyst by removing at least one calcium sulfate layer located on the selective catalytic reduction catalyst, where the in-situ selective catalytic reduction catalyst is part of a selective catalytic reduction system designed to remove nitrogen oxides from an exhaust gas of a coal-fired boiler, the method comprising the steps of:

(I) providing an in-situ selective catalytic reduction catalyst having deposited thereon at least one calcium sulfate layer;

(II) supplying at least one reducing agent to the in-situ selective catalytic reduction catalyst via at least one ammonia injection system of the selective catalytic reduction system that is located upstream thereof, wherein the at least one reducing agent is selected based on its ability to convert the at least one calcium sulfate layer located on the in-situ selective catalytic reduction catalyst to at least one calcium oxide layer located on the in-situ selective catalytic reduction catalyst;

(III) contacting the at least one reducing agent with the at least one calcium sulfate layer located on the in-situ selective catalytic reduction catalyst in order to convert the at least one calcium sulfate layer to at least one calcium oxide layer; and (IV) removing the at least one calcium oxide layer from the in-situ selective catalytic reduction catalyst via at least one sootblower or sonic horn, wherein the selective catalytic reduction catalyst is located in a selective catalytic reduction system for a coal-fired boiler during the method and is therefore an in-situ regeneration of a selective catalytic reduction catalyst.

23. The method of claim 22, wherein the calcium sulfate is contacted with the at least one reducing agent at a temperature greater than about 550° F.

24. The method of claim 22, wherein the at least one reducing agent is supplied in an amount from about one part per million to about several thousand parts per million.

25. The method of claim 22, wherein the in-situ selective catalytic reduction catalyst is contacted with the at least one reducing agent for a time from about a few minutes to about a few hours.

26. The method of claim 22, wherein the selective catalytic reduction system is in simultaneous operation to remove nitrogen oxides during the operation of the method of claim 22.

\* \* \* \* \*